United States Patent [19]

Bernadic et al.

[11] Patent Number: 5,333,972
[45] Date of Patent: Aug. 2, 1994

[54] SPECIAL BORING INSERT

[75] Inventors: Thomas J. Bernadic, Madison Heights; John H. Patterson, Hazel Park; Brendan L. Brockett, Dearborn Heights, all of Mich.

[73] Assignee: Valenite Inc., Madison Hts., Mich.

[21] Appl. No.: 998,753

[22] Filed: Nov. 23, 1992

Related U.S. Application Data

[63] Continuation of Ser. No. 593,829, Oct. 4, 1990, abandoned.

[51] Int. Cl.5 ............................................. B26D 1/00
[52] U.S. Cl. .................................... 407/113; 407/114
[58] Field of Search .................... 407/42, 48, 61, 62, 407/113, 114, 115; 408/199, 200, 227, 230, 713

[56] References Cited

U.S. PATENT DOCUMENTS

| | | | |
|---|---|---|---|
| 3,694,876 | 10/1972 | Erkfritz | 407/113 |
| 3,887,974 | 6/1975 | Sorice | 407/113 |
| 4,028,782 | 6/1977 | Stansak | 407/113 |
| 4,111,589 | 9/1978 | Goeke | 407/114 |
| 4,131,383 | 12/1978 | Powers | 407/114 |
| 4,278,369 | 7/1981 | Jakobs et al. | 407/113 |
| 4,626,141 | 12/1986 | Malaker et al. | 407/114 |
| 4,940,369 | 7/1990 | Aebi et al. | 407/113 |

*Primary Examiner*—Daniel W. Howell
*Attorney, Agent, or Firm*—Bill C. Panagos

[57] ABSTRACT

An indexable, on edge, reversible cutting insert for use with a boring toolhead, comprising a body having parallelogram shaped top and bottom seating faces equipped with an off center aperture there through, and at least one cutting face. The cutting face is equipped with a bidirectional chip breaker groove on each side of the cutting face to define an island, each side groove having a slotting, progressively deepening recess extending along the edge of said cutting face, said groove presenting an increasing incident angled and having a positive rake and an axial rake around the edge of the cutting face, which together form an obtuse angle, said groove forming at least two cutting corners diagonally apposed to each other. Each cutting corner is comprised of a scalloped radius formed in the island which intersects a chip directional flat formed in the groove, at an obtuse angle to form a bidirectional pocket area.

3 Claims, 1 Drawing Sheet

SPECIAL BORING INSERT

This is a continuation of copending application Ser. No. 593,829 filed on Oct. 4, 1990, now abandoned.

BACKGROUND OF THE INVENTION

Field of the Invention

The present invention relates to an indexable on edge reversible cutting insert for use with a boring toolhead. The present invention further relates to an insert having two cutting faces the opposites sides of the insert body. The present invention further relates to a reversible cutting insert wherein the cutting face has scalloped radii formed therein to break chips into manageable 6 and 9 configurations.

Description of the Related Art

Jakobs, et al., U.S. Pat. No. 4,278,369 discloses a cutting insert which is provided with a main cutting edge followed by an auxiliary cutting edge. The main cutting edge is divided into a first main cutting edge functioning as a rough cutter, followed by a second main cutting edge performing rough smoothing. By use the auxiliary cutting edge, final smoothing is achieved. The first main cutting edge is set at a greater angle to the axis of the work piece than the second main cutting edge which, in turn, is set at a greater angle to the axis of the work piece than the auxiliary cutting edge. By reference to FIG. 8 of the '369 patent, it can be seen that there are some similarities to the present invention. Specifically, it appears that there is what could be termed as island 2 surrounded by cutting edges 3, 4, and 5. Main cutting edges 3 and 4 would cut the piece and cutting edge 5 would provide final smoothing. Island 2 is used for mounting purposes to the tool.

Jakobs, et al differs from the present invention in that the present invention provides the unique bidirectional chip breaker groove with cutting corners having scalloped radii and a chip directional flat to form a bidirectional pocket area. Further, there is no indication of the instant angle on a 5° positive which also has a 3° axial rake.

Stansak, U.S. Pat. No. 4,028,782 bears some similarity to the side view of the present invention by referencing FIG. 8. It is seen there that there appears to be a positive rake incident angle which also has an axial rake. However, there is no bidirectional chip breaker groove and neither is there a chip directional flat area in FIG. 8.

Sorice, et al., U.S. Pat. No. 3,887,974 discloses an insert which is transferable from a right handed holder to a left handed holder, which is a mirror image of the right handed holder, by reversing the insert end for end. The insert, has a cutting insert on each end with the respective cutting edge being usable in each of said right hand and left hand holders.

The insert is relatively elongated with the cutting edges in the ends, and the holder has an elongated pocket open on the top and on one side and toward one end in the bottom holder of the insert which inclines downwardly toward the closed side of the pocket in the holder and is held in place in the pocket by a clamp member having end portions engaging the holder and a groove in the insert and held on the holder by a central clamp screw.

Sorice differs from the present invention in that it does not appear that the rake face is inclined toward the incident angle on a positive rake which also has a positive axial rake.

Erkfritz, U.S. Pat. No. 3,694,876 discloses using rectangular blocks for inserts of cutting material having a center hole. The cutter so defined is secured by a conically headed screw in a peripheral pocket of a rotary body of a face milling cutter and adapted for selective indexing about the screw axis into a plurality of cutting positions in each of which a side and end cutting edge is adapted to produce the high rate of metal removal achieved from the milling face cutter. One of the abutments defining each indexed position of the insert in its holder is itself mounted for indexing about its central axis.

Referencing FIGS. 6 and 7, it can be seen that there is a central island 69 with cutting edges 63 and 64 and lands 63a and 64a. They appear to be increasing as they are inclined, however, there is no showing of a positive rake and axial rake maintained around the edge of the cutter.

SUMMARY OF THE INVENTION

The present invention is an indexable, on edge, reversible cutting insert for use with a boring toolhead. The insert is comprised of a body having parallelogram shaped top and bottom seating faces which are equipped with an off center aperture there through and at least one cutting face. The cutting face is equipped with a bidirectional chip breaker groove on each side of the cutting face in which defines an island. Each groove so formed has a slanting progressively deepening recess extending along the edge of the cutting face to present an increasing incident angle having a positive rake and an axial rake around the edge of the cutting face which intersect together at an obtuse angle. The groove forms a cutting edge on at least two corners which are diagonally opposed to each other. Each cutting corners comprised of a scalloped radius formed in the island which intersects a chipped directional flat formed in the groove at an obtuse angle to form a bidirectional pocket. The insert is left and right handed and brakes chips from the work piece into manageable 6 and 9 configurations without having the chip wrap around the boring bar during operation. The axial rake is about 3° and the positive rake is about 5°.

DETAILED DESCRIPTION OF THE PREFERRED EMBODIMENTS

Figure 1:
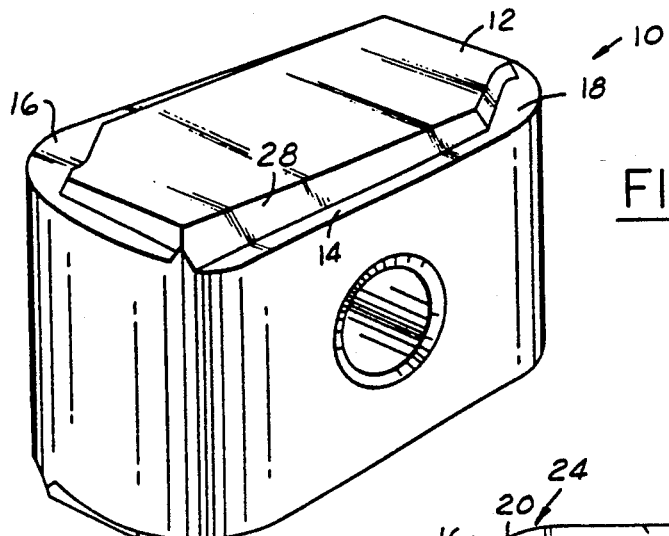
FIG. 1 is a three dimensional perspective view of the insert.
Figure 2:
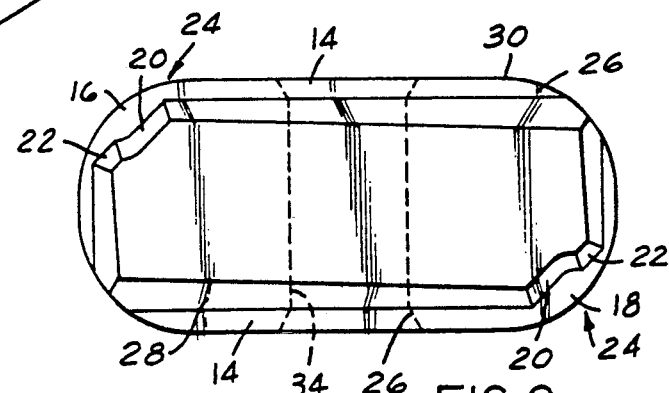
FIG. 2 is a top plan view of the insert showing one of the cutting faces.
Figure 3:
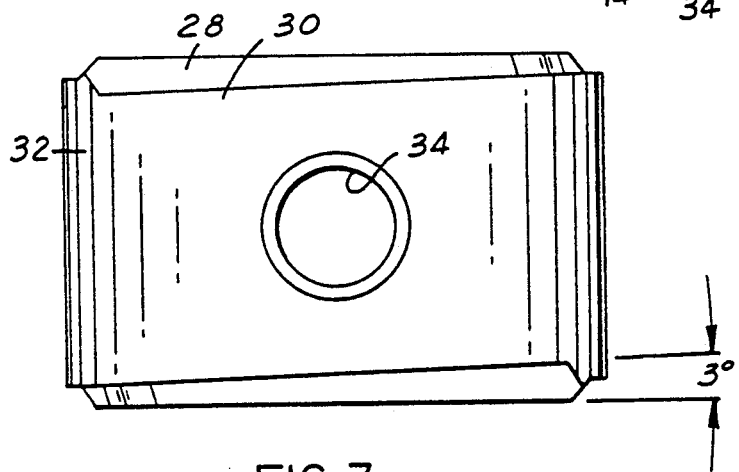
FIG. 3 is a side view of the insert.
Figure 4:
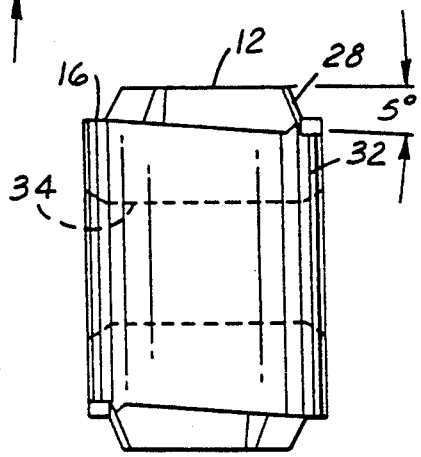
FIG. 4 is an end view of the insert.

The present invention relates to an "on edge" or "stand-up" insert for use on a boring toolhead. The insert is left or right handed i.e. it is manufactured to be right handed and, when flipped around, is left handed. This new insert features advance "chip break" design which avoids the winding of the cutting chip around the boring bar during operation. The present invention breaks the chip into manageable 6 and 9 configurations so they do not interfere with the boring operation.

Referring to the Figures, wherein like numerals depict like structures, insert 10 is configured with island 12 surrounded by bidirectional chip breaker groove 14. Cutting corners 16 and 18 are diagonal opposite each other and comprise scalloped radius 20 and chip directional flat 22 to form a bidirectional pocket area 24.

The chip breaker groove is comprised of a chip breaker land or rake face 26 and an increasing incident angle surface 28. The land 26 and surface 28 intersect at an obtuse angle when viewed in an "on side" perspective. The increasing incident angle surface is important because it allows the cutting operation to produce a chamfer at the bottom of the bore, and also lowers the cutting edge of the insert below center line, thereby increasing chip breaker action.

The rake face is inclined toward the incident angle surface on a 5° positive rake and it also has 3° axial rake. These configurations are maintained around the entire edge of the insert.

Those skilled in the art understand that the insert described above is capable of many modifications without departing from the scope and spirit of the invention.

We claim:

1. An indexable, on edge, reversible cutting insert for use with a boring toolhead, comprising:
a top and bottom face substantially parallel to each other with a sidewall running substantially unbroken therebetween to define a body; said sidewall comprised of seating surfaces opposite each other and end wall portions opposite each other; said body having rounded corners when viewed from said top or bottom face; said top or bottom face having a cutting edge defined by the intersection of the seating surface and the top or bottom face; said cutting edge, when viewed from said seating surface, being inclined relative to said top or bottom face from one corner to the opposite corner of the insert body; a descending land surface rearward of said cutting edge; said descending land surface following said cutting edge; and an increasing incident angle surface rearward of said descending land surface which together with said descending land surface defines a chip breaker groove; each said increasing incident angle surface extending from said descending land surface to said top or bottom face; said descending land surface having a positive rake angle and said increasing incident angle surface having an axial rake angle so as to define a bi-directional chip breaker groove; at least two chip breaker grooves being formed on the top and bottom surface opposite each other, said chip breaker grooves forming at least two diagonally opposed cutting corners; each said cutting corner comprised of a scalloped radius formed in said incident angle surface which intersects a chip directional flat formed in the groove at an obtuse angle to form a bi-directional pocket area; and an aperture centrally located on said seating face and extending through said body to the opposite seating face; said central aperture being counterbored.

2. The reversible cutting insert of claim 1 wherein said positive rake angle is about 5°.

3. The reversible cutting insert of claim 1, wherein said axial rake angle is about 3°.

* * * * *